Feb. 21, 1967 W. E. BERGSMAN ET AL 3,305,622

SHIELDED AND INTERCONNECTED CIRCUIT CONDUCTORS

Filed March 23, 1964

INVENTORS
IRVING W. CHRISTENSEN
WINSTON E. BERGSMAN
BY
Ronald M. O'Keefe

United States Patent Office 3,305,622
Patented Feb. 21, 1967

3,305,622

SHIELDED AND INTERCONNECTED CIRCUIT CONDUCTORS

Winston E. Bergsman and Irving W. Christensen, Phoenix, Ariz., assignors to General Electric Company, a corporation of New York Filed Mar. 23, 1964, Ser. No. 353,873
5 Claims. (Cl. 174—35)

Figure 1:
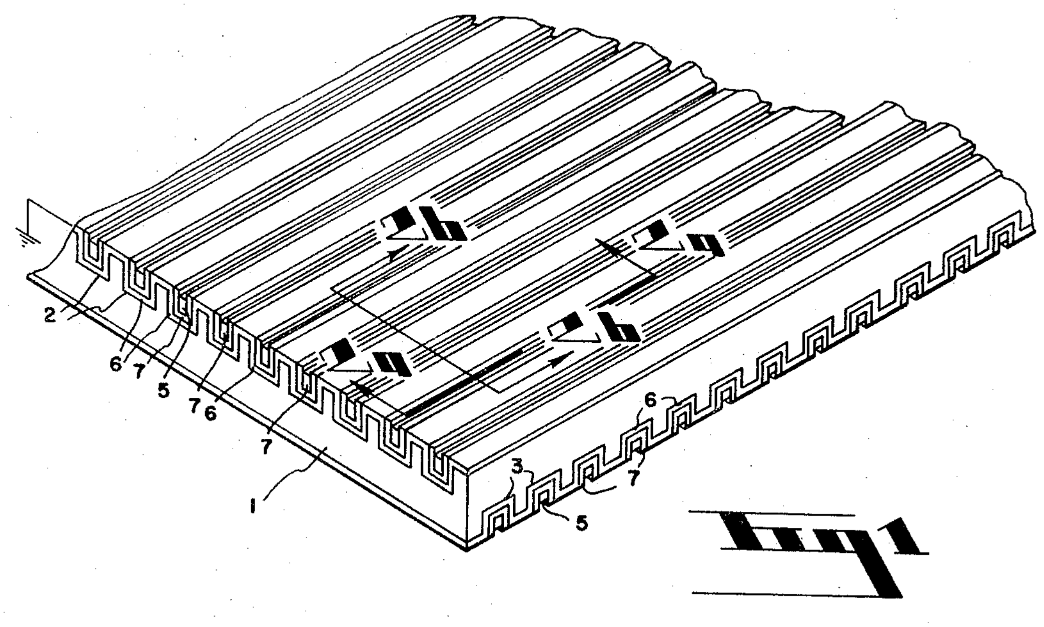

This invention relates to interconnecting media and, in particular, to interconnecting media providing conductive networks for selectively interconnecting electronic components and circuits and to a method for producing the same.

Reliable operation of extremely high speed digital computers having switching times in the order of nanoseconds, for example, requires that signals be transmitted with fidelity and efficiency. The degree to which fidelity and efficiency is attained is a function of the characteristics of the medium interconnecting the signal sources and the signal loads. Noise resulting from signal reflections, magnetic and capacitive cross-coupling, load shifting, ground differences, D.C. level shifts and line impedance changes is directly related to the characteristics of the interconnecting medium and must be minimized for high speed computer operation. The capabilities of conventional interconnecting media, for example, point-to-point wiring, twisted pairs, or planar etched wiring, are severely limited by susceptibility of each of these media to noise due to one or more of the enumerated causes. The present invention relates to an interconnecting medium which transmits high frequency signals with fidelity and efficiency and which is more suitable than conventional media for extremely high speed computer operation.

Microwave signal transmission lines, for example, strip transmission lines and coaxial cable, may be employed to transmit high frequency signals in a computer. However, such arrangements are expensive and require a large volume of space due to the dimensions of the transmission lines and the large number of connections which must be made. The present invention provides an interconnecting medium for high frequency signals which is compact, convenient and relatively inexpensive.

It is an object of the invention to provide an improved interconnecting medium.

It is an object of the invention to provide an improved interconnecting medium wherein each signal conductor is shielded.

It is another object of the invention to provide a reliable interconnecting medium which facilitates formation of complex wiring patterns.

It is another object of the invention to provide an interconnecting medium having improved high frequency electrical characteristics and a high signal-to-noise ratio.

It is a further object of the invention to provide an inexpensive interconnecting medium which is capable of high wiring density and is adapted to automated manufacturing techniques.

It is a further object of the invention to provide a method for fabricating such an interconnecting medium.

Briefly stated, in accordance with the illustrated embodiment of the invention, first and second sets of spaced grooves are formed in the opposite sides of an insulative panel, the grooves of the first set being transverse to the grooves of the second set. A hole is formed through the insulative panel at each point where a groove in one side of the panel crosses a groove in the opposite side of the panel. A first coating of conductive material is deposited on the insulative panel to cover the bottom and side walls of each groove and the walls of each hole. A coating of insulative material is then deposited on the bottom and side walls of each groove and on the walls of each hole over the first coating of conductive material. The insulative material fills and blocks the holes in the insulative panel. Subsequently, a second coating of conductive material is deposited on the bottom and side walls of each groove over the coating of insulative material to provide signal conductors in the grooves. Where it is desired to connect a signal conductor on one side of the panel to a signal conductor on the opposite side of the panel, a small diameter aperture is formed through the insulative material in the appropriate hole prior to the deposition of the second coating of conductive material. The first coating of conductive material which is continuous and which surrounds each signal conductor on three sides is connected to a suitable reference potential to provide shielding for each signal conductor.

Figure 2:
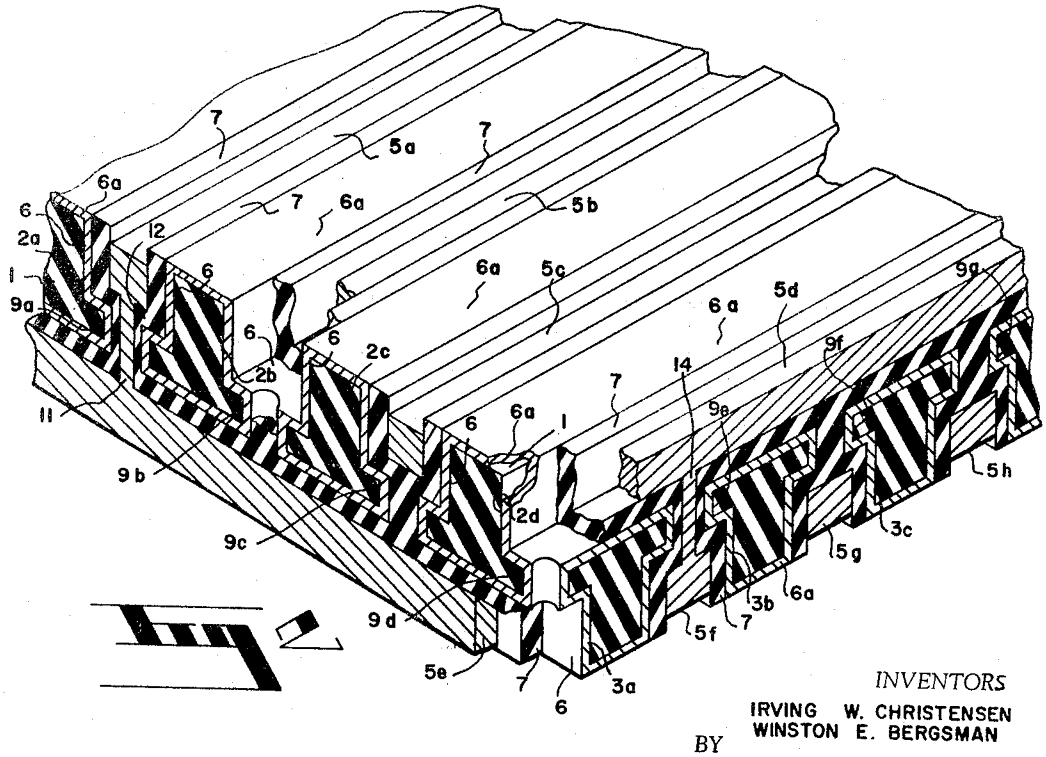

The subject matter of the invention is particularly pointed out and distinctly claimed in the concluding portion of the specification. The invention, however, both as to organization and a method of operation may best be understood by reference to the following description taken in connection with the accompanying drawing, in which:

FIG. 1 is a perspective view of a portion of an embodiment of an interconnecting medium constructed in accordance with the invention; and FIG. 2 is an enlarged sectional, perspective, partially cutaway view of the structure of FIG. 1 taken along the lines *2a* and *2b* of FIG. 1.

With reference to FIG. 1, the embodiment of the invention chosen for illustration employs a sheet or panel 1 of insulative material having a plurality of spaced grooves or sulci 2 formed in one side of the panel and a plurality of spaced grooves or sulci 3 also formed in the other side. Panel 1, normally of predetermined and uniform thickness, may be fabricated from any suitable insulative material, for example epoxy paper sheet, and may be curved or planar depending upon application requirements. Grooves 2 are arranged to be non-intersecting and may be, for example, parallel to each other. Various methods may be employed to form grooves 2 in the panel such as by chemical etching, matching or molding. The plurality of similarly spaced, non-intersecting grooves 3, formed in the side of panel 1 opposite that in which grooves 2 are formed, are arranged to be transverse to grooves 2 and may be perpendicular to grooves 2.

A signal conductor 5 and a shield conductor 6, separated by a layer of insulative material 7, are provided in each of the grooves 2 and 3. The shield conductor 6 in each groove surrounds the associated signal conductor 5 on three sides. All of the shield conductors 6 are interconnected to form a network and are connected to a suitable reference potential, for example ground potential as shown, to simulate a ground plane for the signal conductors 5 in the grooves. The structure therefore approaches the configuration of a coaxial transmission line, the signal conductors exhibiting electrical characteristics similar to those of a coaxial line. The arrangement is particularly effective in minimizing noise due to cross-coupling between the signal conductors.

The structure of the illustrated embodiment of the invention is shown in greater detail in FIG. 2 which is an enlarged, perspective, partially cutaway, sectional view taken along the lines *2a* and *2b* of FIG. 1. Transverse grooves in opposite sides of the insulative panel 1 are initially provided, as previously described, the grooves in one side of the panel being identified by reference numerals *2a*, *2b*, *2c* and *2d* while the grooves in the opposite side of the panel are identified by reference numerals *3a*, *3b*, *3c* and *3d* to facilitate description. A hole is drilled or otherwise formed through insulative panel 1 at each point where a groove in one side of the panel crosses a groove in the opposite side of the panel. Reference numerals 9a, 9b, 9c and 9d identify the holes formed between grooves 2a and 3a, 2b and 3a, 2c and 3a and 2d and 3a respectively, while reference numerals 9e, 9f and 9g identify the holes formed between grooves 2d and 3b, 2d and 3c and 2d and 3d respectively.

A first coating of conductive material is deposited on the bottom and side walls of the grooves 2a–2d and 3a–3d, on the walls of the holes 9a–9g and on the side surfaces of the insulative panel 1 to provide shield conductors 6. The shield conductor in each groove in one side of the panel is connected to the shield conductor in every other groove in the same side of the panel due to the continuity of the first coating of conductive material between the grooves across the side surfaces of the panel, as indicated at 6a. The shield conductor in each groove in one side of the panel is also electrically connected to the shield conductor in every other groove in the opposite side of the panel due to the continuity of the conductive material deposited on the walls of the holes and on the walls of the grooves. A network of interconnected shield conductors is thereby formed. The conductive coating on the walls of the holes and the conductive coating on the walls of the grooves is preferably deposited at the same time and by the same process so as to provide a continuous electrical conductive path having no ohmic junctures.

A coating of insulative material 7 is then deposited on the bottom and side walls of grooves 2a–2d and 3a–3d and on the walls of holes 9a–9g over the first coating of conductive material. The diameter of holes 9a–9g and the thickness of the coating of insulative material 7 are chosen so that the insulative material 7 completely fills the holes, blocking the connecting holes between grooves in opposite sides of the panel.

A second coating of conductive material is next deposited on the bottom and side walls of the grooves over the coating of insulative material to form signal conductors in the grooves. However, prior to deposition of the second coating of conductive material, apertures are selectively drilled or otherwise formed between predetermined pairs of grooves in opposite sides of the panel through the insulative material filling the corresponding holes. The apertures permit electrical connection of the signal conductors in the predetermined pairs of grooves upon deposition of the second coating of conductive material. To illustrate, an aperture 11 in FIG. 2 is formed through the insulative material in hole 9a, the diameter of aperture 11 being less than the diameter of the insulative material in the hole so that a layer 12 of insulative material is retained in hole 9a between aperture 11 and the first coating of conductive material deposited on the walls of hole 9a.

If an electrical connection between the signal conductors in a pair of transverse grooves is not desired, an aperture is not formed in the insulative material in the hole between grooves. As illustrated in the embodiment of FIG. 2, the signal conductors in grooves 2b and 3a, 2c and 3a, 2d and 3c and 2d and 3d are to be isolated while the signal conductors in grooves 2d and 3b are to be electrically interconnected through aperture 14 formed in the insulative material in the hole 9e.

After the apertures are formed through the insulative material in the holes at the desired locations, the second coating of conductive material is deposited in the grooves to form signal conductors. The second coating of conductive material is also deposited in the apertures to form conducting paths or connecting conductors electrically connecting the selected pairs of signal conductors on opposite sides of panel 1. The layers of insulative material retained in the holes when the apertures are formed, for example layer 12 in hole 9a, insulate the connecting conductors from the first coating of conductive material on the walls of the holes. Reliable conducting paths having no ohmic junctures may be provided by simultaneous deposition of the second coating of conductive material in the grooves in both sides of the panel and in the apertures between predetermined pairs of grooves. Reference numerals 5a, 5b, 5c and 5d identify the signal conductors formed by the deposition of the second coating of conductive material in grooves 2a, 2b, 2c and 2d respectively, while reference numerals 5e, 5f, 5g and 5h identify the signal conductors in grooves 3a, 3b, 3c and 3d respectively. Signal conductors 5a and 5e are electrically connected through aperture 11 while signal conductors 5d and 5f are electrically connected through aperture 14. Signal conductors 5b and 5c are electrically isolated from signal conductor 5e. Similarly, signal conductor 5d is electrically isolated from signal conductors 5g and 5h.

FIGURE 2 clearly shows the coaxial nature of the shielded signal conductors of the illustrated embodiment of the invention, with each signal conductor being surrounded on three sides by a shield conductor. In addition to providing shielding for the signal conductors, the circuit board structure of the invention provides shielding for the conductive paths connecting selected signal conductors on opposite sides of the insulative panel. For example, the conductive material in aperture 11 which serves to connect signal conductors 5a and 5e is surrounded by the first coating of conductive material on the walls of hole 9a.

The resistance of the network of shield conductors is minimized because of the multiple interconnection of the shield conductors through the conductive material of the first layer deposited on the side surfaces of the insulative panel and on the walls of the holes. The conductive material on the side surfaces of the insulative panel which interconnects the shield conductors in grooves in the same side of the panel, as illustrated at 6a in FIG. 2, may be eliminated without departing from the spirit of the invention, as the shield conductors are otherwies electrically interconnected through the holes, as shown in FIG. 2. Variation in the electrical characteristics of the illustrated embodiment of the interconnecting medium of the invention may be effected by varying either the thickness or the dielectric constant of the insulative material 7.

The illustrated embodiment of the invention provides an interconnecting medium between signal sources and signal loads which exhibits improved reliability due to elimination of mechanical type connections within the medium, each conductive path being a continuous piece of copper or other conductive material. The shield or ground plane provided by the network of interconnected shield conductors results in a high signal-to-noise ratio and improved high frequency electrical characteristics. Complex circuit configurations may be obtained by selectively forming apertures through the insulative material in the holes between grooves in opposite sides of the board before deposition of the second coating of conductive material. Circuit boards embodying the invention permit a high wiring density to be attained and are readily adapted to automated manufacture with resulting lower cost per point connected. As applied to electronic computers, the interconnecting medium of the invention enables reliable high speed computer operation since noise due to reflections, magnetic and capacitive cross-coupling, load shift and line impedance changes is significantly reduced.

Although the invention and its operation has been described with reference to a specific embodiment, there will be immediately obvious to those skilled in the art many modifications in structure, arrangement, proportions, elements, materials, and components used in the practice of the invention which are particularly adapted for specific environments and operating requirements, without departing from those principles. It is therefore intended that the invention be not limited to the particular details shown and described which may be varied without departing from the spirit and scope of the invention and the appended claims.

What is claimed as new and desired to be secured by Letters Patent of the United States is:

1. A circuit board interconnecting medium comprising: an insulative panel, a first set of spaced grooves formed in one side of said panel, a second set of spaced grooves formed in the opposite side of said panel, said grooves of said second set being transverse to said grooves of said first set, a coating of conductive material deposited on the walls of each of said grooves of said first and said second sets, a plurality of signal conductors, each of said signal conductors being positioned in one of said grooves of said first and said second sets, insulating means provided in each of said grooves of said first and said second sets for insulating said signal conductors from said coatings of conductive material, and a plurality of connecting conductors, each of which extend through said insulative panel between the signal conductor in a selected groove of said first set and the signal conductor in a selected groove of said second set at a point where said selected grooves of said first and said second sets cross each other to thereby electrically connect the signal conductors in said selected grooves, each of said connecting conductors being insulated from said coatings of conductive material in said selected grooves.

2. The circuit board interconnecting medium of claim 1 which includes conductive means extending through said insulative panel and insulated from said connecting conductors for interconnecting the coatings of conductive material on the walls of said grooves of said first and said second sets to form an electrical shield network for said plurality of signal conductors.

3. A circuit board interconnecting medium comprising: an insulative panel, a first set of spaced grooves formed in one side of said panel, a second set of spaced grooves formed in the opposite side of said panel, said grooves of said first set being transverse to said grooves of said second set, a plurality of holes extending through said insulative panel, each hole being positioned at a point where a groove of said first set crosses a groove of said second set, a coating of conductive material deposited on the walls of each of said grooves and on the walls of said holes, the coatings of conductive material on the walls of said grooves of said first and said second sets being interconnected through the coatings of conductive material on the walls of said holes to form a shield network, a coating of insulative material deposited on the walls of each of said grooves of said first and said second sets and on the walls of said holes, a conductor positioned in each of said grooves of said first and said second sets, said conductor being insulated from said coating of conductive material by said coating of insulative material, and a plurality of connecting conductors, each of which extends through a selected one of said pluralities of holes to interconnect the conductors in the corresponding grooves of said first and said second sets.

4. A circuit board interconnecting medium comprising: an insulative panel, a first set of spaced grooves formed in one side of said panel, a second set of spaced grooves formed in the opposite side of said panel, said grooves of said first set being transverse to said grooves of said second set, a plurality of holes extending through said insulative panel, each hole being positioned at a point where a groove of said first set crosses a groove of said second set, a plurality of signal conductors, each of said signal conductors being positioned in one of said grooves, a plurality of shield conductors, each of said shield conductors being positioned in one of said grooves to shield the signal conductor in that groove, conductive means extending through each of said plurality of holes in said insulative panel for interconnecting said plurality of shield conductors, and a plurality of connecting conductors, each of which extends through a selected one of said plurality of holes to interconnect the signal conductors in the corresponding grooves of said first and said second sets, each of said connecting conductors being insulated from said shield conductors in the corresponding grooves and from said conductive means in the selected hole.

5. A circuit board interconnecting medium comprising: an insulative panel, a first set of spaced grooves formed in one side of said panel, a second set of spaced grooves formed in the opposite side of said panel, said grooves of said first set being transverse to said grooves of said second set, a plurality of holes extending through said insulative panel, each hole being positioned at a point where a groove of said first set crosses a groove of said second set, a first coating of conductive material deposited on the walls of each of said grooves and on the walls of said holes, the first coatings of conductive material on the walls of said grooves of said first and said second sets being interconnected through the first coatings of conductive material on the walls of said holes to form a shield network, a coating of insulative material deposited on the walls of each of said grooves of said first and said second sets and on the walls of said holes, a plurality of apertures, each of said apertures being formed in the insulative material in a selected hole and extending between the corresponding grooves of said first and said second sets, and a second coating of conductive material deposited on the walls of each of said grooves of said first and said second sets over said coating of insulative material to form signal conductors and on the walls of said apertures, said second coating of conductive material on the walls of each of said apertures serving as a connecting conductor to connect the signal conductors in the corresponding grooves of said first and said second sets.

References Cited by the Examiner

UNITED STATES PATENTS

| | | | |
|---|---|---|---|
| 2,019,625 | 11/1935 | O'Brien. | |
| 2,586,854 | 2/1953 | Myers. | |
| 3,076,862 | 2/1963 | Luedicke et al. | 174—68 |

LEWIS H. MYERS, *Primary Examiner.*

D. L. CLAY, *Assistant Examiner.*